No. 882,780. PATENTED MAR. 24, 1908.
W. P. ELLIOTT & W. P. ELLIOTT, Jr.
SWINGING BELL.
APPLICATION FILED JULY 26, 1907.
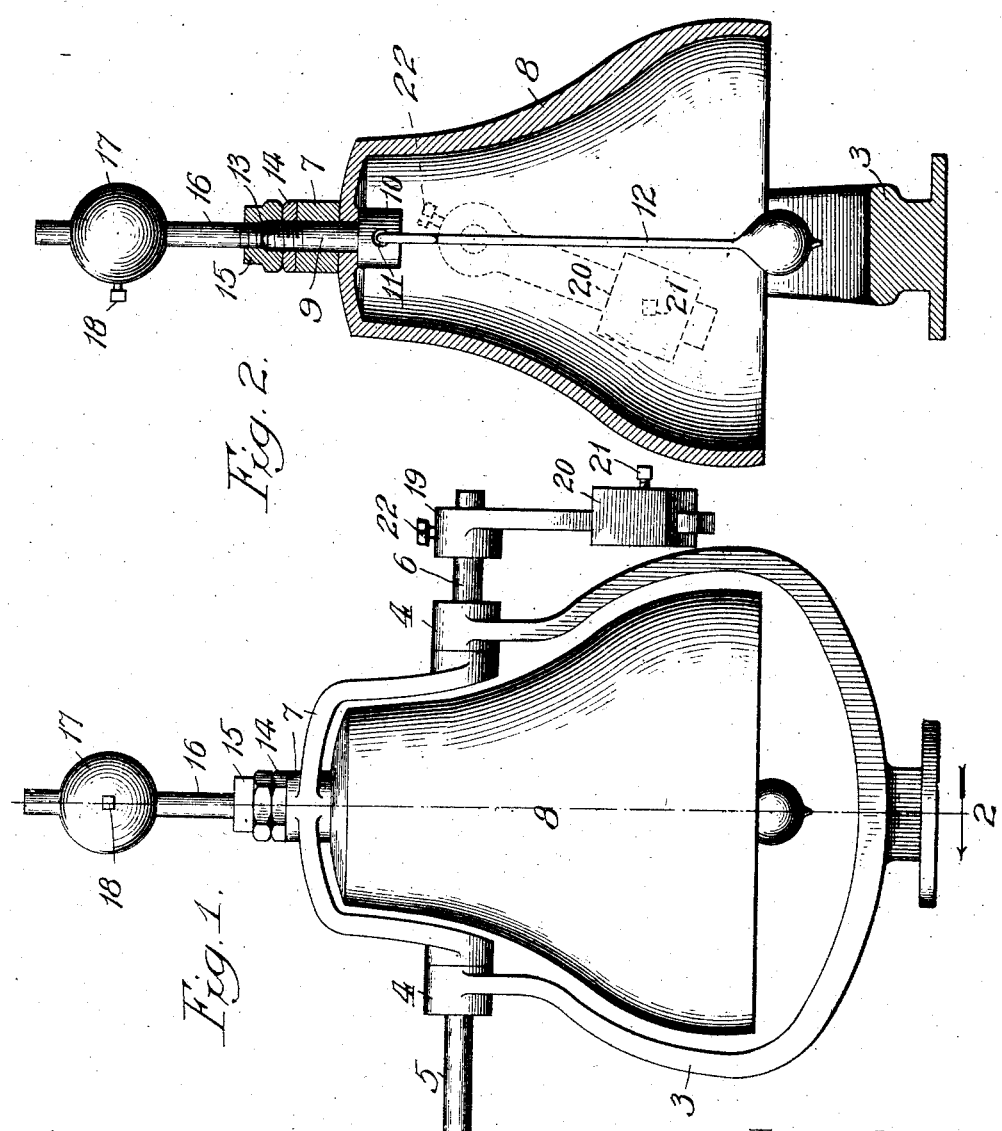
Witnesses:
Inventors:
William P. Elliott
William P. Elliott Jr.,
By Dyrenforth, Lee, Chritton & Wiles,
Attys.

UNITED STATES PATENT OFFICE.

WILLIAM P. ELLIOTT AND WILLIAM P. ELLIOTT, JR., OF LA GRANGE, ILLINOIS.

SWINGING BELL.

No. 882,780.         Specification of Letters Patent.         Patented March 24, 1908.

Application filed July 26, 1907. Serial No. 385,677.

*To all whom it may concern:*

Be it known that we, WILLIAM P. ELLIOTT and WILLIAM P. ELLIOTT, Jr., citizens of the United States, residing at La Grange, in the county of Cook and State of Illinois, have invented a new and useful Improvement in Swinging Bells, of which the following is a specification.

This invention relates to improvements for use on bells of the variety in which the body of the bell is carried on a yoke having trunnions journaled in a frame; and the primary object of the invention is to insure equal swinging of the bell to opposite sides of its normal perpendicular position by exertion of the same amount of power for swinging it in each direction.

We have more particularly devised our invention to overcome a difficulty encountered in installing signaling-bells in connection with pneumatically-operated railway-gates, where the bell is swung through the medium of suitable air-pressure mechanism; but our improvement has utility in all connections in which the variety of bells referred to is employed where it presents the same difficulty we have overcome as hereinafter explained. As these bells, and more particularly those of less expensive make, come from the foundry, they are in the condition of unfinished castings and the weight of the body is usually distributed non-uniformly throughout the casting whereby it is rendered heavier on one side of the perpendicular center than on the other; so that unless the difference in weight be compensated for, more power is required to positively raise the bell toward the heavier side than to similarly raise it toward the opposite side. To counteract this difficulty and accomplish the above-stated object, we have devised the means illustrated in the accompanying drawing, in which—

Figure 1 shows, by a view in elevation, a swinging bell equipped with our improvement, and Fig. 2 is a section taken at the line 2 on Fig. 1 and viewed in the direction of the arrow.

The frame 3, shown as a standard, is provided on the upper ends of its arms with bearings 4, 4 for the trunnions 5 and 6 of a yoke 7, in which the body 8 of the bell is rigidly fastened. The fastening means illustrated consist of a stem 9 passing through the top or crown of the bell-body wherein it terminates in a head 10 containing an eye 11 in which is hooked the tongue 12, the stem passing upwardly through the yoke beyond which it is threaded at 13 for screwing upon it a nut 14 to fasten the bell-body to the yoke; and a jam-nut 15 is screwed on the outer end of the stem and receives the lower threaded end of a post 16 passing through a counter-weight 17 adapted to be raised and lowered on the post for adjustment and provided with a set-screw 18 for fastening it in adjusted position. On the trunnion 6 is adjustably secured by a set screw 22, a crank-arm 19 carrying an adjustable weight 20 provided with a set-screw 21 for securing it in adjusted position. The set-screw 22 is provided for regulating the angle at which the bell slants when it is at rest, the provision of the adjustable weight 20 being required in cases where the bell is formed with one of its sides heavier than the other; and the set-screw 21 is provided for enabling the weight 20 to be positioned on the arm 19 at the required distance from the trunnion 5 to regulate the momentum of the bell when in motion.

In Fig. 2 the bell-body is represented as containing a greater thickness of metal and being, thus, heavier on one side of its perpendicular center than on the other, which would cause it, when hung in its bearings to occupy a more or less inclined position. If the bell is actuated from such inclined position, obviously more power is required to be exerted to raise the body toward its heavier than toward its lighter side, so that the power predetermined for the purpose must be sufficient to overcome the weight of the heavier side, but then it is excessive for overcoming that of the lighter side, thereby incurring waste of power and producing unevenness of stroke, or if only sufficient power is predetermined to raise the body toward its lighter side such power is insufficient to raise, or adequately raise, the bell-body toward its heavier side. To compensate for this difference, we set the arm 19 to extend at a suitable angle toward the lighter side of the bell-body and adjust the weight 20 upon it into proper position to add it to that side and thus render the body at both sides of its perpendicular center equal or approximately equal in gravity. The weight 17 is added, by providing it in the position shown, to that of the bell-body above its journals thereby to tend to counter-balance the body at opposite sides of the center upon which it swings and thus ease the operation of swinging it; and by rendering the weight 17 adjustable further from and nearer to the body of the bell, according to requirement ascertained by test, it will serve to supplement the air-pressure or other ringing power employed by its gravity as soon as it is turned from the perpendicular position. Of course the higher the position of the ball, the greater will be this supplementing gravity effect exerted by it.

What we claim as new and desire to secure by Letters Patent is—

1. In combination with a swinging bell provided with trunnions, a crank-arm on a trunnion thereof and provided with a weight, for the purpose set forth.

2. In combination with a swinging bell provided with trunnions, a crank-arm adjustably secured on one of the trunnions thereof and provided with a weight, for the purpose set forth.

3. In combination with a swinging bell provided with trunnions, a crank-arm adjustably secured on a trunnion thereof, and a weight adjustably secured on said arm, for the purpose set forth.

WILLIAM P. ELLIOTT.
WILLIAM P. ELLIOTT Jr.

In presence of—
 RALPH SCHAEFER,
 W. T. JONES.